US006855924B2

(12) United States Patent
Kobayashi et al.

(10) Patent No.: US 6,855,924 B2
(45) Date of Patent: Feb. 15, 2005

(54) ORTHOGONAL ACCELERATION TIME-OF-FLIGHT MASS SPECTROMETER

(75) Inventors: Tatsuji Kobayashi, Tokyo (JP); Kenji Nagatomo, Tokyo (JP); Tetsuichiro Morita, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 10/720,950

(22) Filed: Nov. 24, 2003

(65) Prior Publication Data

US 2004/0108453 A1 Jun. 10, 2004

(30) Foreign Application Priority Data

Nov. 22, 2002 (JP) ....................................... 2002-339665

(51) Int. Cl.[7] .......................... H01J 49/40; B01D 59/44

(52) U.S. Cl. ........................ 250/287; 250/286; 250/288; 250/283; 250/281; 250/397

(58) Field of Search ................................ 250/287, 286, 250/288, 283, 397, 281

(56) References Cited

U.S. PATENT DOCUMENTS 6,600,155 B1 * 7/2003 Andrien et al. ............. 250/287
6,674,068 B1 * 1/2004 Kammei ..................... 250/287
6,683,301 B2 * 1/2004 Whitehouse et al. ....... 250/288

FOREIGN PATENT DOCUMENTS

JP 2002-117802 4/2002

* cited by examiner

*Primary Examiner*—Nikita Wells
(74) *Attorney, Agent, or Firm*—Webb Ziesenheim Logsdon Orkin & Hanson, P.C.

(57) ABSTRACT

An orthogonal acceleration time-of-flight (oa-TOF) mass spectrometer is offered in which the repeller plate forming the ion reservoir is prevented from being electrically charged. This in turn prevents the mass spectral resolution and sensitivity from deteriorating. The mass spectrometer has an (a) external ion source for producing ions, (b) a space in which the ions are made to stay, (c) the ion reservoir consisting of the repeller plate and grids disposed on the opposite sides of the space to accelerate the ions in a pulsed manner out of the space, (d) a time-of-flight mass spectrometric portion for mass separating the ions taken out of the ion reservoir via its internal grids, (e) an ion detector for detecting the mass-separated ions, and (f) a heater for heating the repeller plate.

13 Claims, 8 Drawing Sheets

ORTHOGONAL ACCELERATION TIME-OF-FLIGHT MASS SPECTROMETER

BACKGROUND OF THE INVENTION

Field of the Invention

The present invention relates to an orthogonal acceleration time-of-flight (oa-TOF) mass spectrometer and, more particularly, to an oa-TOF mass spectrometer capable of preventing deterioration of the mass spectral resolution due to electrical charging of the repeller plate and grids forming the ion reservoir.

A mass spectrometer is an instrument in which ions created from a sample are made to travel through a vacuum. During the process of the flight, ions having different masses are separated and recorded as a spectrum. Known types of mass spectrometers include: magnetic mass spectrometer in which ions are dispersed according to mass using a sector magnetic field; quadrupole mass spectrometer (QMS) for sorting ions (filtering) according to mass using quadrupole electrodes; and time-of-flight mass spectrometer (TOFMS) for separating ions by making use of variations in time of flight due to different masses.

Of these mass spectrometers, magnetic mass spectrometer and QMS are adapted for ion sources that create ions continuously. On the other hand, TOFMS is suitable for ion sources that create pulsed ions. Accordingly, if one attempts to use a continuous ion source for TOFMS, some arrangement is necessary for utilization of the ion source. The orthogonal acceleration time-of-flight mass spectrometer (oa-TOFMS) is one example of TOFMS designed to emit pulsed ions from a continuous ion source.

A typical configuration of oa-TOFMS is shown in FIG. 1. This instrument has an external continuous ion source 1 (such as electron impact (EI) ion source, chemical ionization (CI) ion source, field desorption (FD) ion source, electrospray ion (ESI) source, or fast atom bombardment (FAB) ion source), differentially pumped walls 10 consisting of first and second partition chamber and a vacuum pump (not shown), a first orifice 2 formed in the first partition wall of the differentially pumped chamber 10, a ring lens 3 placed within the differentially pumped chamber 10, a second orifice 4 formed in the second partition wall forming the differentially pumped chamber 10, an intermediate chamber 11 where ion guides 5 are placed, lenses 6 consisting of focusing lenses and deflectors, a launcher 7 consisting of a repeller plate and accelerating lenses (grids), a reflector 8 for reflecting ions, and a measuring chamber 13 where components forming the ion optics such as an ion detector 9, are placed.

In this configuration, ions generated from the sample in the external ion source 1 are first introduced into the differentially pumped chamber 10 through the first orifice 2. The ions tending to diffuse within the differentially pumped chamber 10 are focused by the ring lens 3. Then, the ions are admitted through the second orifice 4 into the intermediate chamber 11, where the ions decrease in kinetic energy. The ion beam diameter is reduced by an RF electric field produced by the ion guides 5. The ions are then guided into the high-vacuum measuring chamber 13. The partition wall that partitions the intermediate chamber 11 and the measuring chamber 13 from each other is provided with a third orifice 12. This orifice 12 shapes the ions that are guided in by the ion guides 5 into an ion beam of a given diameter. The ion beam is then passed into the measuring chamber 13.

The lenses 6 including the focusing lenses and deflectors are installed at the entrance of the measuring chamber 13. The ion beam entering the measuring chamber 13 is corrected for diffusion and deflection by the lenses 6 and introduced into the launcher 7. Installed inside the launcher 7 are the ion reservoir and accelerating lenses arrayed in a direction orthogonal to the axis of the ion reservoir. In this ion reservoir, a repeller plate is disposed opposite to grids.

Referring to FIG. 2, the ion beam first travels straight toward the ion reservoir 17 that is located among the repeller plate 14, grids 15, and accelerating lenses 16. The ion beam 18 moving straight through the ion reservoir 17 and having a given length is accelerated in a pulsed manner in a direction (X-axis direction) orthogonal to the direction (Y-axis direction) along which the ion beam 18 enters, by applying a pulsed accelerating voltage to the repeller plate 14. This forms pulsed ions 19 which begin to travel toward a reflector (not shown) mounted opposite to the ion reservoir 17.

The ions accelerated in the vertical direction travel in a slightly oblique direction slightly deviating from the X-axis direction, because the velocity in the Y-axis direction assumed on entering the measuring chamber 13 and the velocity in the X-axis direction orthogonal to the Y-axis direction are combined. The latter velocity is given by the repeller plate, grids, and accelerating lenses. The ions are reflected by the reflector 8 and arrive at the ion detector 9.

When the ions are being accelerated, the same potential difference acts on every ion regardless of the masses of the individual ions. Therefore, lighter ions have greater velocities and vice versa. As a consequence, variations in ion mass appear as variations in arrival time taken to reach the ion detector 9. Variations in ion mass can be transformed into variations in ion transit time and thus ions of differing masses can be separated.

In this way, the continuous ion source can be applied to TOFMS adapted for a pulsed ion source by accelerating the ion beam created from the continuous ion source 1 in a pulsed manner by the launcher 7 consisting of the repeller plate, grids, and accelerating lenses.

In oa-TOFMS, the kinetic energy of ions made to enter the ion reservoir is normally set to a very small value of less than 50 eV. Therefore, oa-TOFMS is affected much more by charging of the electrodes than the magnetic mass spectrometer. As a result, if the electrodes forming the ion reservoir are charged at all (prior to pulsing), the ion beam introduced into the ion reservoir is deflected and tilted as shown in FIG. 3. This deteriorates the resolution and sensitivity of oa-TOFMS. Such charging can occur quite easily by adhesion of organics to the surfaces of the electrodes, the organics being residues of the sample ions.

One conventional measure for correcting this problem has been to mount a deflector immediately ahead of the ion reservoir of the oa-TOFMS instrument, along with the focusing lenses. Another measure has been to set the energy of the ion beam introduced into the ion reservoir to a larger value to reduce the effects of charging of the electrodes and other components. A further measure has been to mount a mechanism for applying an offset voltage to the repeller plate, for applying a DC voltage that cancels the charging.

If such a deflector is mounted, it is doubtless that deflection of the ion beam can be corrected. However, this is limited to cases where the ion beam is deflected ahead of the mounted deflector. If the repeller plate or accelerating lenses (grids) of the ion reservoir have been charged, correction of the deflection using the deflector is done almost unsuccessfully.

Setting the injection energy of the ion beam introduced into the ion reservoir to a larger value is more advantageous than mounting the deflector. Ions having an injection energy greater than the charging voltage at the repeller plate would be able to travel straight such that the beam is hardly deflected by the charging of the repeller plate. However, there may be a demand for decreasing the whole size of the instrument. Also, there may be a demand for space savings. Where these demands are taken into consideration, it is desired that ions introduced into the ion reservoir be accelerated in a direction as orthogonal as possible to the inlet axis of the ion reservoir. For this purpose, it is necessary to apply an accelerating voltage to the repeller plate that pushes out ions more strongly for high injection energies.

Although it can be said that increasing the injection energy is advantageous, there are practical limitations. Furthermore, the effects of charging are not always constant but liable to vary according to the degree of contamination of the instrument and with the elapse of time. In addition, there is the problem that, if a high-voltage power supply or a detector withstanding high voltages is adopted, the cost is increased accordingly.

Moreover, if a mechanism for applying an offset voltage to the repeller plate is mounted, and if a method of applying a DC voltage that cancels charging is used, an additional DC power supply capable of accurate voltage control is necessary. This incurs increased costs.

SUMMARY OF THE INVENTION

In view of the foregoing, it is an object of the present invention to provide an orthogonal acceleration time-of-flight mass spectrometer capable of preventing unstable charging due to adhesion of organics on a repeller plate forming an ion reservoir to thereby prevent deterioration of the mass spectral resolution and sensitivity.

This object is achieved by an orthogonal acceleration time-of-flight mass spectrometer according to the present invention, the spectrometer comprising: an external ion source for producing ions; a space in which the ions are made to stay; an ion reservoir consisting of a repeller plate and grids that are placed on the opposite sides of the space to accelerate the ions in a pulsed manner out of the space; a time-of-flight mass spectrometric portion for mass separating the ions taken out of the ion reservoir via its internal grids; an ion detector for detecting the mass-separated ions; and heating means for heating the repeller plate.

In one feature of the present invention, the heating means also heats focusing lenses and a slit mounted between the external ion source and the ion reservoir, in addition to the grids.

In another feature of the present invention, the heating means is placed on the opposite side of the repeller plate from the ion reservoir through which the ions pass, and the heating means provides indirect heating by its radiative heat.

In a further feature of the present invention, the heating means is a heater or lamp.

In still another feature of the present invention, the heater is formed by stretching a metal wire in a zigzag fashion over a metal plate.

In yet another feature of the present invention, the metal wire is mounted over the metal plate via insulators and is not in direct contact with the metal plate.

In an additional feature of the present invention, the metal wire is made of a metal showing low vapor pressures at high temperatures, such as tantalum, platinum, or tungsten.

In still another feature of the present invention, the heater is heated to 100–1,000° C.

In yet another feature of the present invention, a temperature sensor is mounted close to the heating means.

In a still additional feature of the present invention, the temperature sensor is a thermocouple.

In yet a further feature of the present invention, a signal from the temperature sensor is fed back to a power supply that energizes the heating means.

Other objects and features of the present invention will appear in the course of the description thereof, which follows.

DETAILED DESCRIPTION OF THE INVENTION

Figure 1:
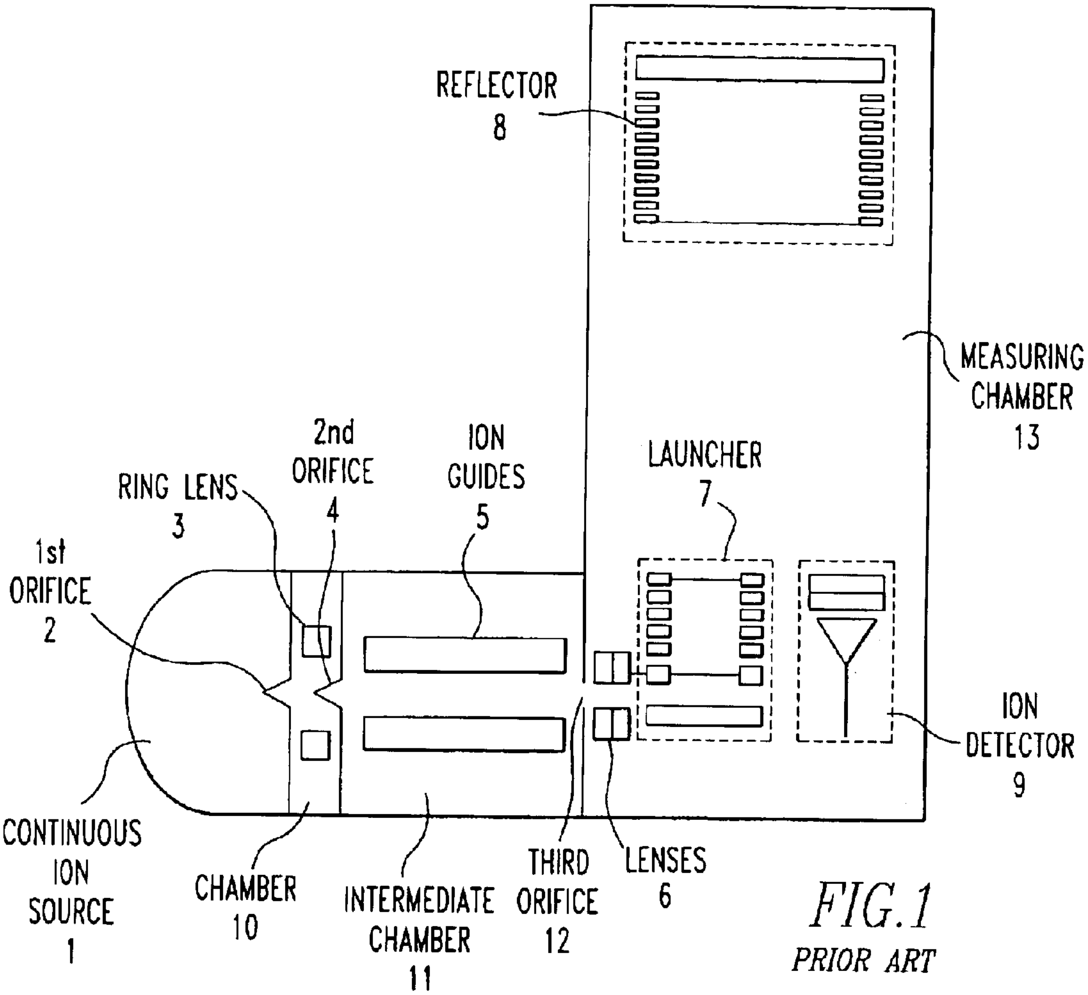
FIG. 1 PRIOR ART
FIG. 1 is a diagram of the prior art orthogonal acceleration time-of-flight (oa-TOF) mass spectrometer.
Figure 2:
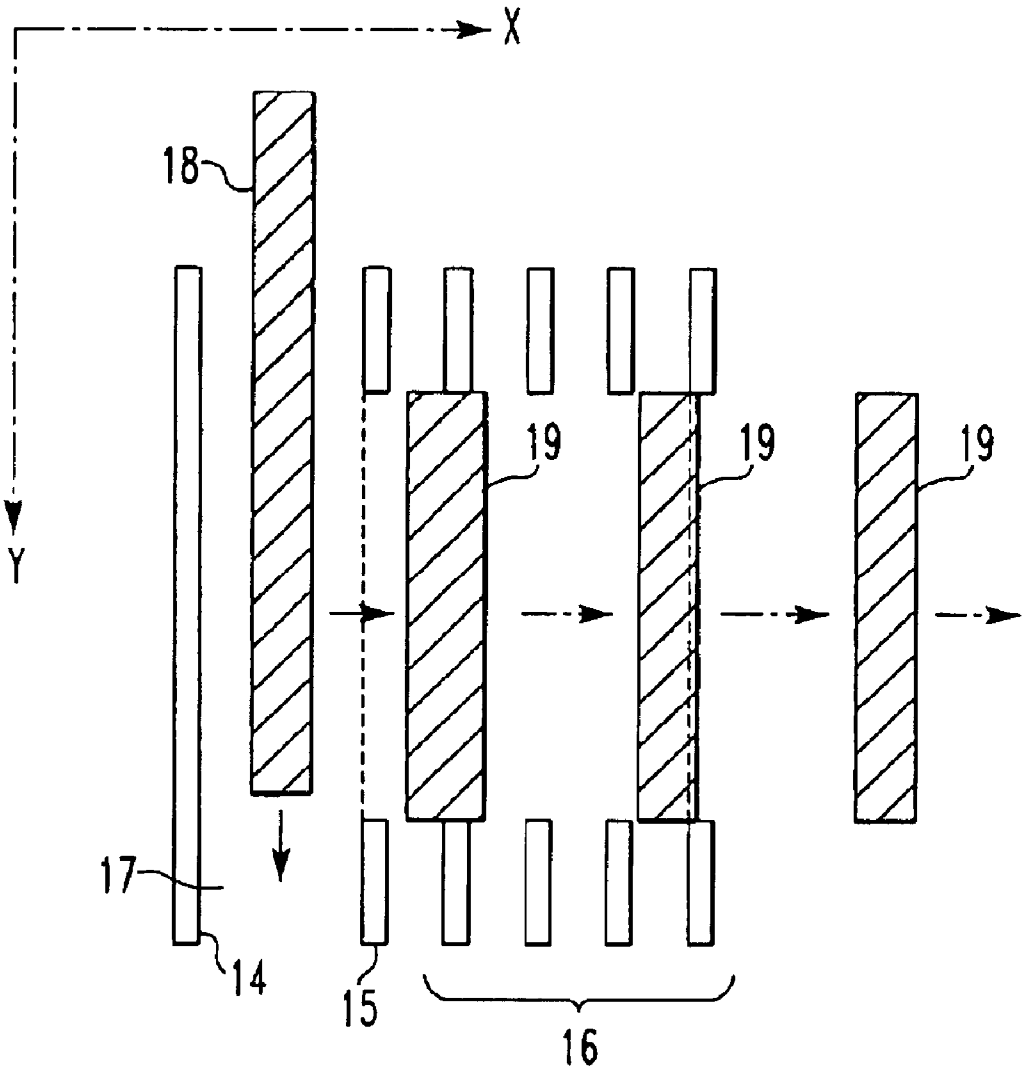
FIG. 2 PRIOR ART
FIG. 2 shows the vicinities of the ion reservoir of the prior art oa-TOF mass spectrometer shown in FIG. 1.
Figure 3:
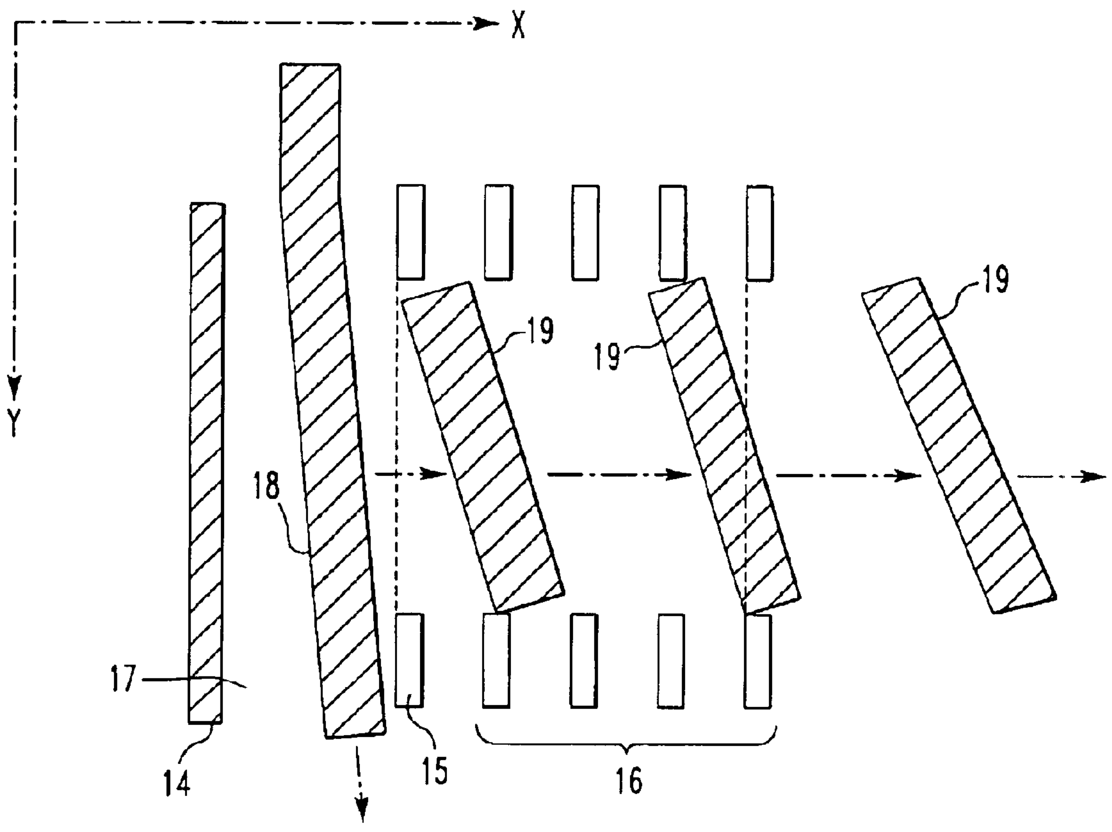
FIG.3 PRIOR ART
FIG. 3 shows the vicinities of the ion reservoir of the prior art oa-TOF mass spectrometer shown in FIG. 1.
Figure 4:
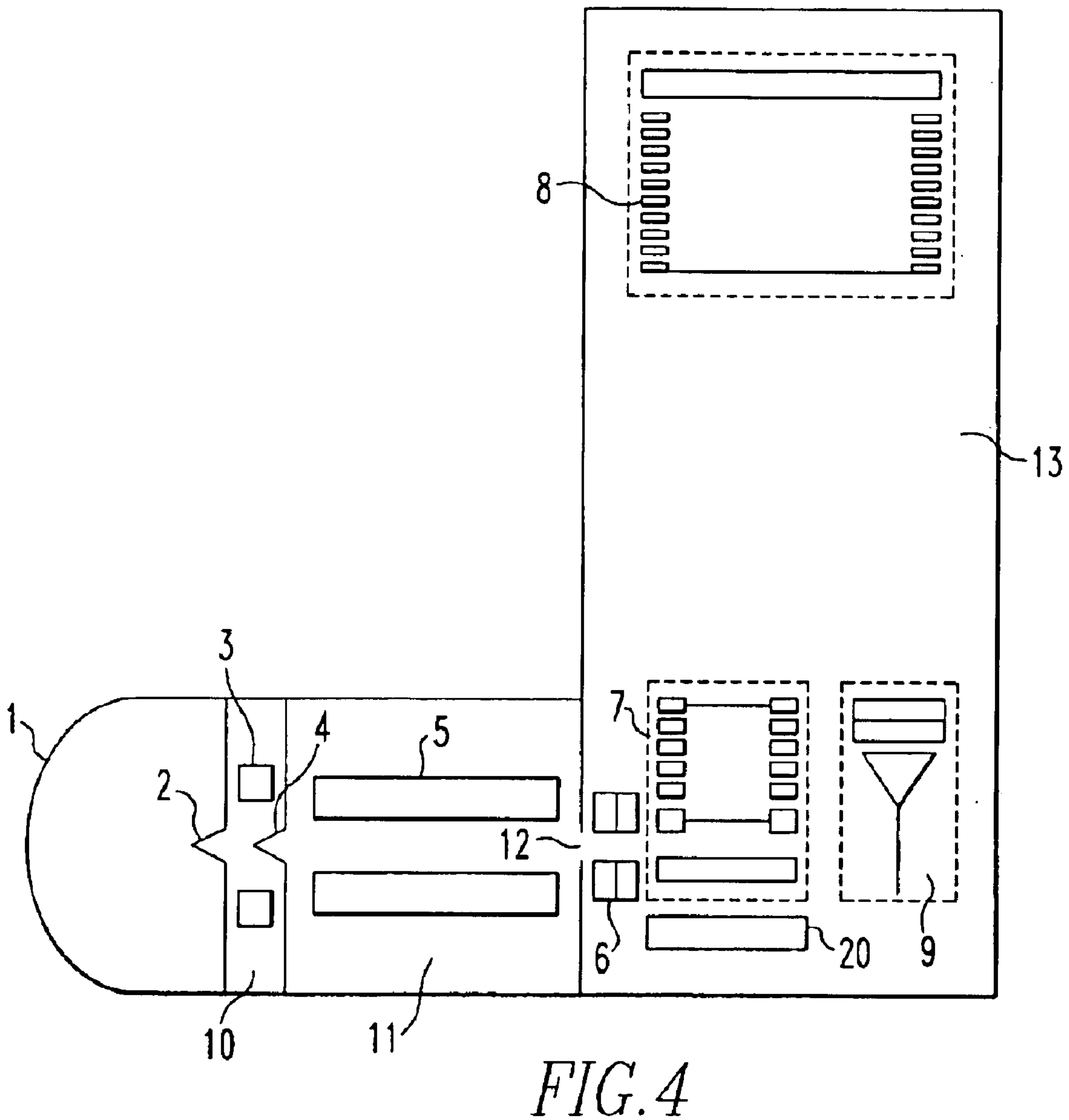
FIG. 4 is a diagram of an orthogonal acceleration time-of-flight (oa-TOF) mass spectrometer according to one embodiment of the present invention.

The preferred embodiments of the present invention are hereinafter described with reference to the accompanying drawings. FIG. 4 shows an orthogonal acceleration time-of-flight (oa-TOF) mass spectrometer according to one embodiment of the present invention. This instrument comprises an external continuous ion source 1 (such as electron impact (EI) ion source, chemical ionization (CI) ion source, field desorption (FD) ion source, electrospray ion (ESI) source, or fast atom bombardment (FAB) ion source), differentially pumped chamber 10 consisting of first and second partition walls and a vacuum pump (not shown), a first orifice 2 formed in the first partition wall of the differentially pumped chamber 10, a ring lens 3 placed within the differentially pumped chamber 10, a second orifice 4 formed in the second partition wall forming the differentially pumped chamber 10, an intermediate chamber 11 where ion guides 5 are placed, lenses 6 consisting of focusing lenses and deflectors, a launcher 7 consisting of a repeller plate and accelerating lenses (grids), a reflector 8 for reflecting ions, and a measuring chamber 13 where components forming the ion optics, such as an ion detector 9, are placed. A heater 20 is spaced close to the repeller plate within the launcher 7 such that a narrow space is left between them.

In this configuration, ions generated from the sample in the external ion source 1 are first introduced into the differentially pumped chamber 10 through the first orifice 2. The ions tending to diffuse within the differentially pumped chamber 10 are focused by the ring lens 3 inside the differentially pumped chamber 10. Then, the ions are admitted through the second orifice 4 into the intermediate chamber 11, where the ions decrease in kinetic energy. The ion beam diameter is reduced by an RF electric field produced by the ion guides 5. The ions are then guided into high-vacuum measuring chamber 13. The partition wall that partitions the intermediate chamber 11 and the measuring chamber 13 from each other is provided with a third orifice 12. After being guided by the ion guides 5, the ions are shaped into an ion beam of a given diameter by the third orifice 12 and passed into the measuring chamber 13.

The lenses 6 consisting of the focusing lenses and deflectors are installed at the entrance of the measuring chamber 13. The ion beam entering the measuring chamber 13 is corrected for diffusion and deflection by the lenses 6 and introduced into the launcher 7. Installed inside the launcher 7 are the ion reservoir and accelerating lenses arrayed in a direction orthogonal to the axis of the ion reservoir. In this ion reservoir, a repeller plate is disposed opposite to grids. The heater 20 for heating the repeller plate by radiative heat is mounted close to the repeller plate forming one wall of the ion reservoir. This heater 20 is shown enlarged in FIG. 5.

Figure 5:
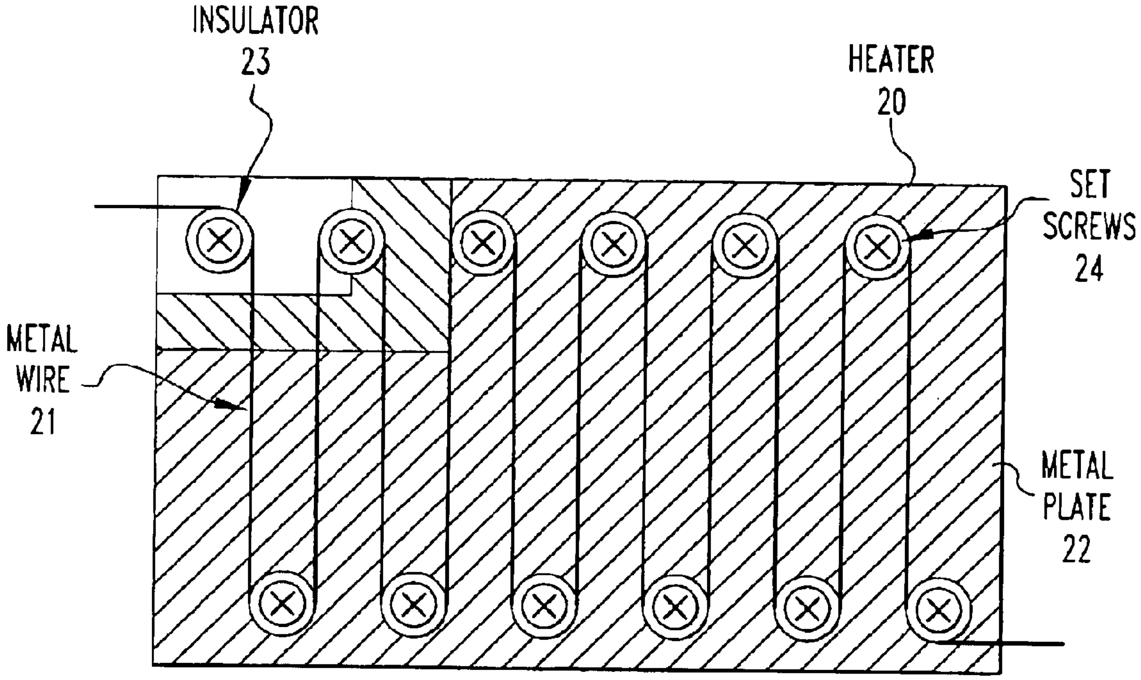
FIG. 5 shows one example of a heater for use in an oa-TOF mass spectrometer according to one embodiment of the present invention.

FIG. 5 shows one example of the heater spaced close to the repeller plate. The heater 20 is made of a single wire 21 of a metal that shows low vapor pressures at high temperatures, such as tantalum, platinum, or tungsten. This metal wire 21 is stretched in a zigzag fashion over a metal plate 22. The metal wire 21 is firmly held on holding poles via insulators 23 by set screws 24 and stretched over the metal plate 22 to prevent direct contact between the metal wire 21 and the metal plate 22. Both ends of the metal wire 21 act as lead wires for supplying electric power and are connected with a power supply (not shown).

Figure 6:
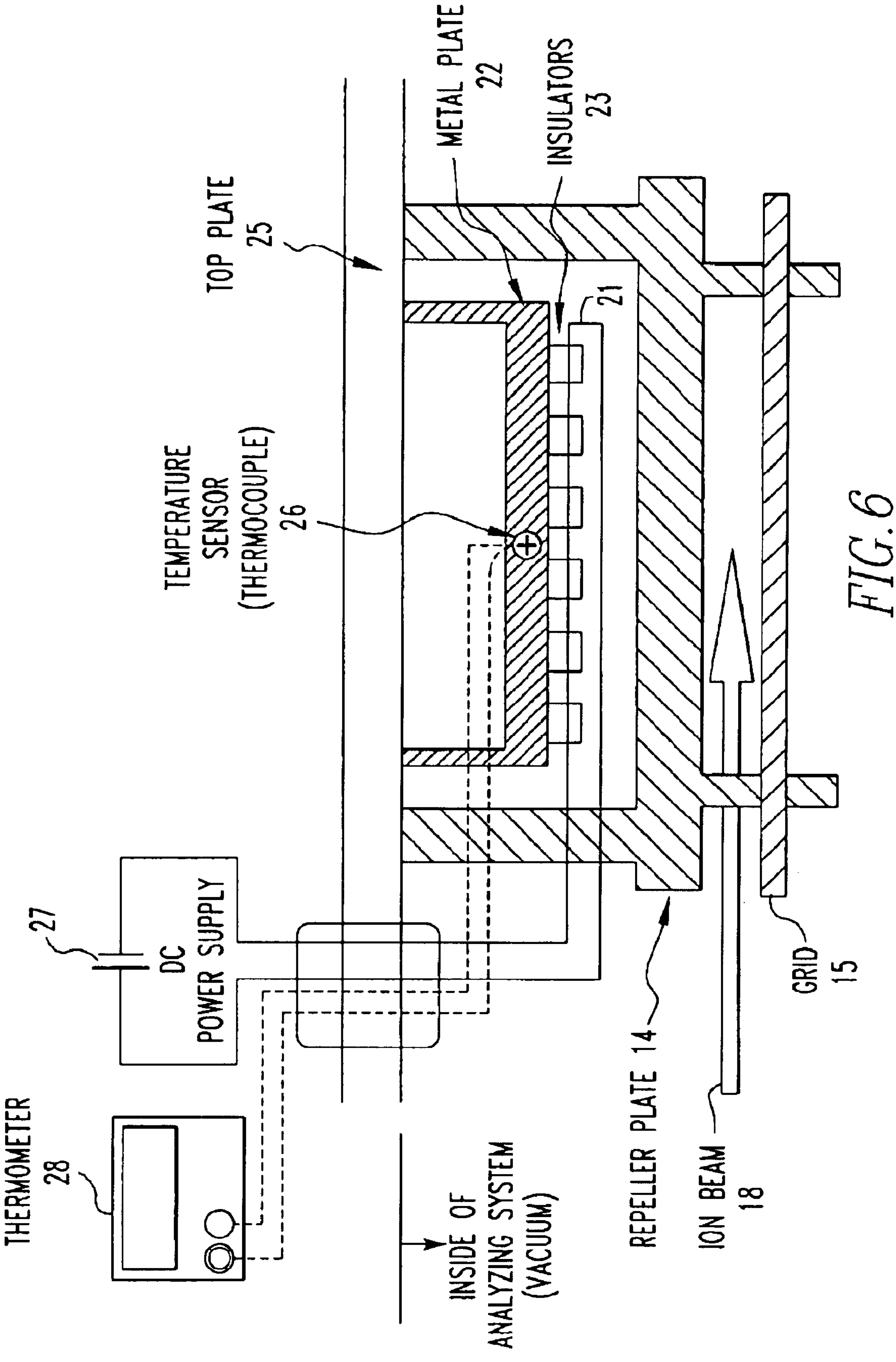
FIG. 6 shows the vicinities of an ion reservoir for use in an oa-TOF mass spectrometer according to one embodiment of the present invention.

As shown in FIG. 6, this heater 20 is mounted on the opposite side of the repeller plate 14 from the ion reservoir side, i.e., the path of the ion beam 18, in such a way that the heater wire 21 is not in direct contact with the repeller plate 14. A temperature sensor 26 consisting of a thermocouple or the like is mounted on the metal plate 22 that forms the heater 20, the metal plate 22 being fixedly mounted on a top plate 25. Thus, the temperature of the heater can be measured. The lead wires from the heater 20 are connected with a DC power supply 27. The lead wires from the temperature sensor 26 are connected with a thermometer 28.

The repeller plate is heated by the heater 20 in the manner described below. First, the DC power supply 27 for the heater 20 is turned on. The tantalum wire 21 acts as a heating element and generates heat. At this time, the DC voltage applied to the heater 20 is about 12 to 14 V. As a result, the heater is heated to about 100 to 1,000° C. Radiative heat from the tantalum wire 21 indirectly heats the repeller plate 14 and then the grids 15. Since the heater 20 is insulated from the repeller plate 14 via a space, the heater can be used while continuously heating these components during measurements for mass analysis. The heater 20 can be used without problem when the inside of the instrument is at atmospheric pressure. Therefore, when the instrument is being pumped, it can be baked out by turning on the heater 20 and heating the repeller plate 14.

Figure 7:
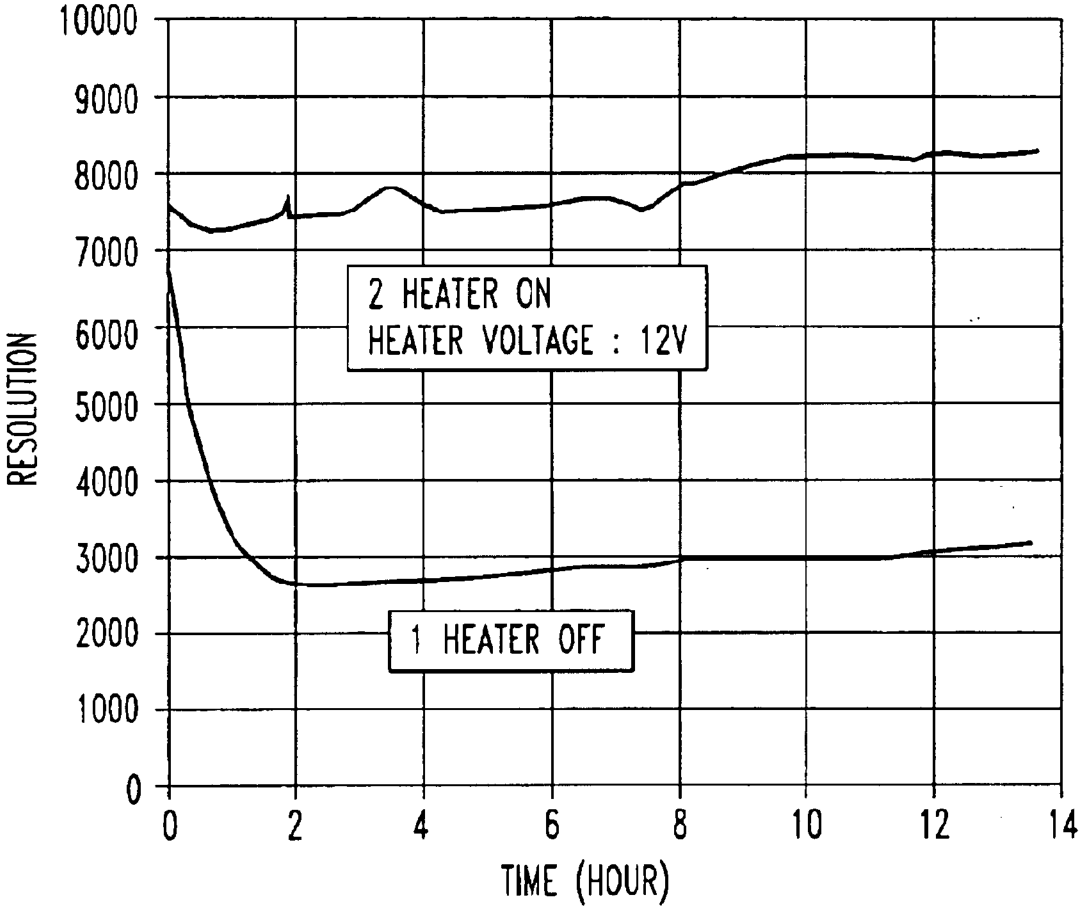
FIG. 7 is a graph showing the manner in which the resolution of the oa-TOF mass spectrometer shown in FIG. 5 varies with the elapse of time.

FIG. 7 shows the manner in which the resolution of the oa-TOFMS varies with the elapse of time in a case where the repeller plate 14 is heated by the heater 20 and in a case where the plate is not heated. As is obvious from the graph, when the repeller plate 14 was heated by the heater 20, a resolution of better than 7,000 could be maintained over a long time. On the other hand, when the repeller plate 14 was not heated by the heater 20, the resolution decreased to less than 3,000 only after two hours from the beginning of the measurement. This means that organics that were residues of the sample ions and water adhered to the surface of the repeller plate 14, causing charging. This misaligned the ion beam, thus deteriorating the instrumental resolution. That is, the deterioration of the resolution can be prevented by heating the repeller plate 14 at all times.

Figure 8:
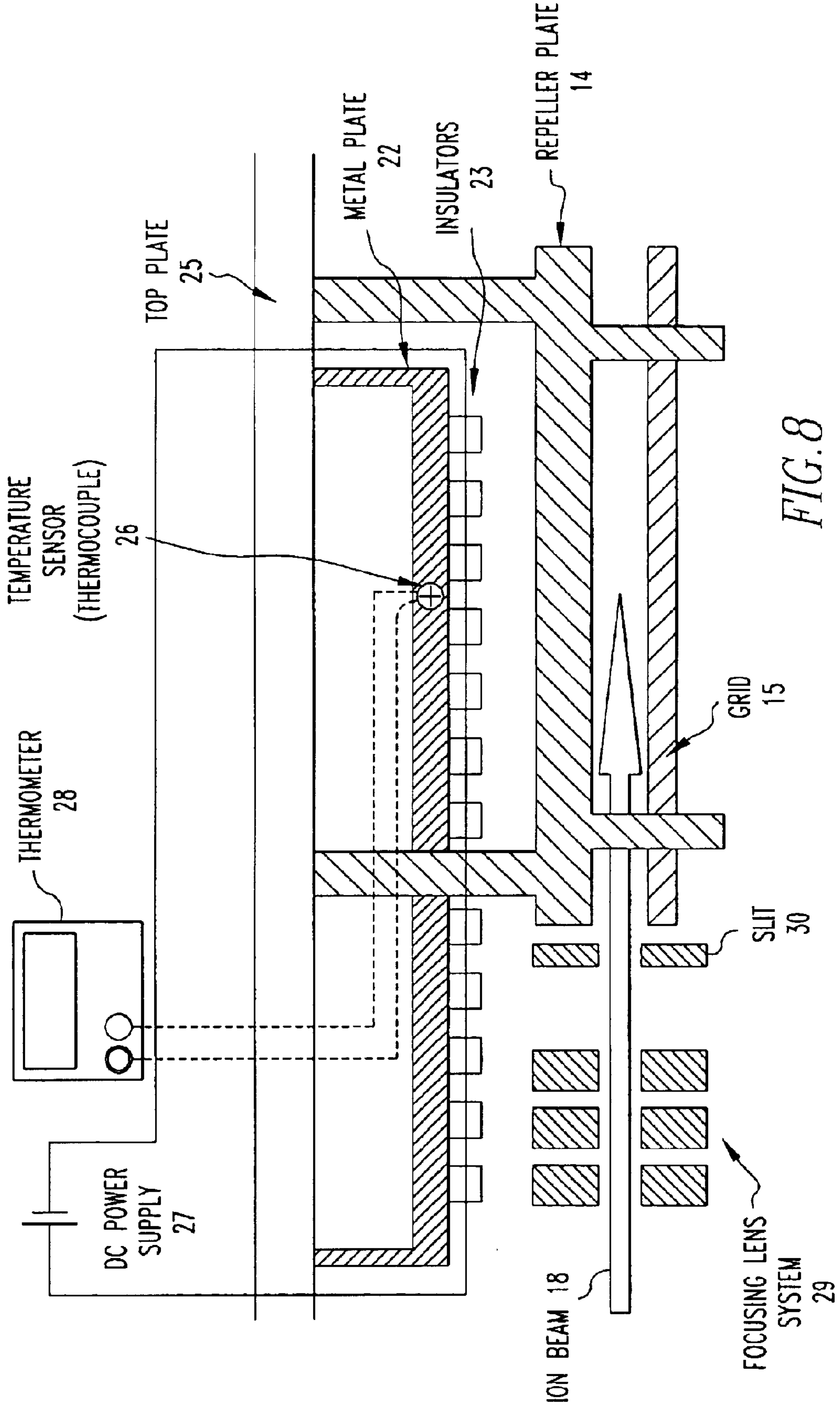
FIG. 8 shows the vicinities of a modification of the ion reservoir shown in FIG. 6.

While one embodiment of the present invention has been described so far, various changes and modifications can be made to the present invention. For example, as shown in FIG. 8, the lateral dimension of the heater 20 is increased so that a focusing lens system 29 in a stage preceding the repeller plate 14 and a slit 30 are heated, as well as the repeller plate 14. Furthermore, the output signal from the temperature sensor 26 may be fed back to the DC power supply 27 for the heater 20, and the heater voltage may be turned on and off. In this way, the heater temperature may be controlled to a desired value. Furthermore, the repeller plate 14 may be composed of mesh-like matter instead of the solid plate. In addition, a lamp may be used instead of the tantalum wire.

As described so far, an orthogonal acceleration time-of-flight (oa-TOF) mass spectrometer according to the present invention comprises an external ion source for producing ions, a space in which the ions are made to stay, an ion reservoir consisting of a repeller plate and grids that are disposed on the opposite sides of the space to accelerate the ions in a pulsed manner out of the space, a time-of-flight spectrometric portion for mass separating the ions taken out from the ion reservoir via its internal grids, an ion detector for detecting the mass-separated ions, and heating means for heating the repeller plate. The repeller plate and other components forming the ion reservoir are prevented from becoming electrically charged. Hence, the mass spectral resolution and sensitivity can be prevented from deteriorating.

Having thus described our invention with the detail and particularity required by the Patent Laws, what is desired protected by Letters Patent is set forth in the following claims.

What is claimed is:

1. An orthogonal acceleration time-of-flight mass spectrometer comprising:

an external ion source for producing ions;

a space in which said ions are directed;

an ion reservoir consisting of a repeller plate and grids that are placed on the opposite sides of said space to accelerate the ions in a pulsed manner out of the space;

a time-of-flight mass spectrometric portion for mass separating the ions taken out of the ion reservoir via its internal grids;

an ion detector for detecting the mass-separated ions; and heating means for heating said repeller plate indirectly by radiation whereby the repeller plates remain uncharged until pulsing.

2. The orthogonal acceleration time-of-flight mass spectrometer of claim 1, wherein said heating means also heats focusing lenses and a slit mounted between the external ion source and the ion reservoir, in addition to the grids.

3. The orthogonal acceleration time-of-flight mass spectrometer of claim 1 or 2, wherein said heating means is placed on the opposite side of the repeller plate from the ion reservoir through which the ions pass, and wherein said heating means provides indirect radiative heating.

4. The orthogonal acceleration time-of-flight mass spectrometer of claim 1 or 2, wherein said heating means is one of a heater and a lamp.

5. The orthogonal acceleration time-of-flight mass spectrometer of claim 4, wherein said heater is formed by stretching a metal wire in a zigzag fashion adjacent a metal plate.

6. The orthogonal acceleration time-of-flight mass spectrometer of claim 5, wherein said metal wire is mounted over said metal plate via insulators and is not in direct contact with said metal plate.

7. The orthogonal acceleration time-of-flight mass spectrometer of claim 5, wherein said metal wire is made of a metal showing low vapor pressures at high temperatures such as tantalum, platinum, or tungsten.

8. The orthogonal acceleration time-of-flight mass spectrometer of claim 6, wherein said metal wire is made of a metal showing low vapor pressures at high temperatures such as tantalum, platinum, or tungsten.

9. The orthogonal acceleration time-of-flight mass spectrometer of claim 4, wherein said heater may be heated to 100–1,000° C.

10. The orthogonal acceleration time-of-flight mass spectrometer of claim 1, wherein a temperature sensor is mounted close to said heating means.

11. The orthogonal acceleration time-of-flight mass spectrometer of claim 10, wherein said temperature sensor is a thermocouple.

12. The orthogonal acceleration time-of-flight mass spectrometer of claim 10, wherein a signal from said temperature sensor is fed back to a power supply that energizes said heating means.

13. The orthogonal acceleration time-of-flight mass spectrometer of claim 1, wherein said heating means heats during pump out and remains continuously on during measurements for mass analysis.

* * * * *